United States Patent
Zhou et al.

(10) Patent No.: US 9,338,799 B2
(45) Date of Patent: May 10, 2016

(54) METHOD FOR RANDOM ACCESS OF MACHINE TO MACHINE (M2M) TERMINALS

(75) Inventors: Lei Zhou, Beijing (CN); Hai Wang, Beijing (CN); Xufeng Zheng, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 470 days.

(21) Appl. No.: 13/407,666

(22) Filed: Feb. 28, 2012

(65) Prior Publication Data

US 2012/0220325 A1 Aug. 30, 2012

(30) Foreign Application Priority Data

Feb. 28, 2011 (CN) .......................... 2011 1 0057159
Sep. 2, 2011 (CN) .......................... 2011 1 0269101

(51) Int. Cl.
| | |
|---|---|
| H04B 7/00 | (2006.01) |
| H04B 15/00 | (2006.01) |
| H04W 74/08 | (2009.01) |
| H04W 68/02 | (2009.01) |
| H04W 4/00 | (2009.01) |
| H04W 4/08 | (2009.01) |

(52) U.S. Cl.
CPC .......... *H04W 74/0833* (2013.01); *H04W 4/005* (2013.01); *H04W 4/08* (2013.01); *H04W 68/02* (2013.01)

(58) Field of Classification Search
CPC ...... H04W 4/005; H04W 48/00; H04W 48/02
USPC ................................................. 455/509, 507
See application file for complete search history.

(56) References Cited

U.S. PATENT DOCUMENTS

| | | | | |
|---|---|---|---|---|
| 8,565,080 | B2 * | 10/2013 | Kavanaugh et al. | 370/230 |
| 8,650,619 | B2 * | 2/2014 | Sundaram et al. | 726/4 |
| 8,681,701 | B2 * | 3/2014 | Lee et al. | 370/328 |
| 2008/0153521 | A1 * | 6/2008 | Benaouda | G01D 4/004 |
| | | | | 455/466 |
| 2010/0130218 | A1 * | 5/2010 | Zhang et al. | 455/450 |
| 2011/0274040 | A1 * | 11/2011 | Pani et al. | 370/328 |
| 2011/0299492 | A1 * | 12/2011 | Lee et al. | 370/329 |
| 2011/0310804 | A1 * | 12/2011 | Beygzadeh | 370/328 |

(Continued)

FOREIGN PATENT DOCUMENTS

WO   WO 2011/006437 A1   1/2011

OTHER PUBLICATIONS

International Search Report dated Oct. 19, 2012 in connection with International Application No. PCT/KR2012/001500.

(Continued)

*Primary Examiner* — Tilahun B Gesesse

(57) ABSTRACT

A method for random access of Machine to Machine (M2M) terminals is applied to a plurality of M2M terminals. The method includes dividing the plurality of M2M terminals into at least one terminal group, and allocating an identifier for each terminal group. After receiving the paging broadcast signaling transmitted by the base station, an M2M terminal in a terminal group determines whether the terminal group identifier carried in the paging broadcast signaling is the identifier of the terminal group that includes the M2M terminal. If true, the M2M terminal starts a random access process. A base station transmits a paging broadcast signaling on the basis of a terminal group rather than issuing a paging broadcast signaling only to individual M2M terminals so that a plurality of M2M terminals can be randomly accessed smoothly and efficiently without causing network access congestion nor affecting the use of public network users.

20 Claims, 20 Drawing Sheets

(56) References Cited

U.S. PATENT DOCUMENTS

| | | | |
|---|---|---|---|
| 2013/0010593 A1* | 1/2013 | Cha | H04W 74/006 370/230 |
| 2013/0029713 A1* | 1/2013 | Jang | H04W 24/10 455/517 |
| 2013/0058284 A1* | 3/2013 | Yuk et al. | 370/328 |

OTHER PUBLICATIONS

Written Opinion of the International Searching Authority dated Oct. 19, 2012 in connection with International Application No. PCT/KR2012/001500.

3GPP SA WGS Temporary Document, TD S2-102634, "Randomisation in Access Stratum", 3GPP TSG SA WG2 Meeting #79, May 10-14, 2010, pp. 1-3.

3GPP TR 23.888 V1.0.0 (Jul. 2010), "3rd Generation Partnership Project: Technical Specification Group Services and System Aspects; System Improvements for Machine-Type Communications; (Release 10)", Jul. 2010, 80 pages.

3GPP TS 22.368 V10.0.0 (Mar. 2010), "3rd Generation Partnership Project; Technical Specification Group Services and System Aspects; Service requirements for Machine-Type Communications (MTC); Stage 1 (Release 10)", Mar. 2010, 22 pages.

* cited by examiner

| Field | Size (bits) | Value/Description | Condition |
|---|---|---|---|
| Num_Groups | | Num_Groups indicates the number of paged Groups in a corresponding paging group | |
| Group ID | | Used for indicating group | |
| Paging cycle | | Used to indicate Paging cycle for the group to be paged | |
| Paging purpose for group | | Used to indicate the purpose of the PAG-ADV message | |

FIG.2B

| Field | Size (bits) | Value/Description | Condition |
|---|---|---|---|
| Num_Groups | | Num_Groups indicates the number of paged Groups in a corresponding paging group | |
| Group ID | | Used for indicating group | |
| Num_group members | | Num_Group members indicates the number of paged Group members in a group | |
| MAC Address Hash | | used to identify the group member to be paged | |
| Deregistration Identifier | | Used to indicate Deregistration ID for the group member to be paged | |
| Paging cycle | | Used to indicate Paging cycle for the group member to be paged | |
| Paging purpose for group | | Used to indicate the purpose of the PAG-ADV message | |

FIG.3B

| Field | Size (bits) | Value/Description | Condition |
|---|---|---|---|
| Num_Groups | | Num_Groups indicates the number of paged Groups in a corresponding paging group | |
| Group ID | | Used for indicating group | |
| First group members ID | | First group member ID indicates first member ID to be paged | |
| Last group members ID | | Last group member ID indicates first member ID to be paged [first group member ID, last group member ID] to be paged | |
| Paging cycle | | Used to indicate Paging cycle for the group to be paged | |
| Paging purpose for group | | Used to indicate the purpose of the PAG-ADV message | |

FIG.4B

| Field | Size (bits) | Value/Description | Condition |
|---|---|---|---|
| Num_Groups | | Num_Groups indicates the number of paged Groups in a corresponding paging group | |
| Group ID | | Used for indicating group | |
| Paging change count | | Indication the time of paging change for one group and certain paging purpose | |
| Paging cycle | | Used to indicate Paging cycle for the group to be paged | |
| Paging purpose for group | | Used to indicate the purpose of the PAG-ADV message | |

FIG.5B

| Priority | Service type |
|---|---|
| 0 | Normal priority traffic |
| 1 | High priority traffic |

FIG.6B

| Field | Size (bits) | Value/Description | Condition |
|---|---|---|---|
| Network access MIN access class of frame (i) | 1 | INTEGER (0..1) | |
| Network access MIN access class of frame (i+1) | 1 | INTEGER (0..1) | |
| Network access MIN access class of frame (i+2) | 1 | INTEGER (0..1) | |
| Network access MIN access class of frame (i+3) | 1 | INTEGER (0..1) | |

FIG.6E

| Field | Size (bits) | Value/Description | Condition |
|---|---|---|---|
| Temp priority class change indication | | Temporarily change priority priority class of M2M devices | |

FIG.6F

| Field | Condition |
|---|---|
| Access channel group (i) | $0 \leq R \leq 3$ |
| Access channel group (i+1) | $4 \leq R \leq 7$ |
| Access channel group (i+2) | $8 \leq R \leq 11$ |
| Access channel group (i+3) | $12 \leq R \leq 15$ |

FIG.8A

| Access class restriction | Notes |
|---|---|
| 0 | M2M devices may access the network |
| 1 | M2M devices may not access the network |

FIG.8B

| Field | Size (bits) | Value/Description | Condition |
|---|---|---|---|
| Restriction of access class (i) | 1 | INTEGER (0..1) | $0 \leq R \leq 3$ |
| Restriction of access class (i+1) | 1 | INTEGER (0..1) | $4 \leq R \leq 7$ |
| Restriction of access class (i+2) | 1 | INTEGER (0..1) | $8 \leq R \leq 11$ |
| Restriction of access class (i+3) | 1 | INTEGER (0..1) | $12 \leq R \leq 15$ |

FIG.8C

METHOD FOR RANDOM ACCESS OF MACHINE TO MACHINE (M2M) TERMINALS

CROSS-REFERENCE TO RELATED APPLICATION(S) AND CLAIM OF PRIORITY

The present application is related to and claims priority under 35 U.S.C. §119 to applications filed in the State Intellectual Property Office on Feb. 28, 2011, and Sep. 2, 2011, and assigned Serial Nos. 201110057159.3 and 201110269101.5, respectively, the contents of which are incorporated herein by reference.

TECHNICAL FIELD OF THE INVENTION

The present invention relates to mobile communication technology, especially to a method for random access of Machine to Machine (M2M) terminals.

BACKGROUND OF THE INVENTION

Currently, there exists only a terminal for public network business that is man-machine interaction communication or human interaction communication. A terminal access method for this type of communication is described as shown in FIG. 1. FIG. 1 is a diagram illustrating a terminal access process in the prior art. This process can comprise the following steps:

In step 101, the Base Station (BS) sends out a paging message PAG-ADV, which carries MAC address, paging cycle and Deregistration identifier (DID) of the Machine to Machine (M2M) terminal. DID is used to identify Idle Mode M2M terminals.

Therein, a page period is the period according to which the BS sends PAG-ADV to a terminal. As the identifier allocated for the terminal when it is in free mode, DID can identify the terminal uniquely, and requires less bits comparing with the MAC address.

In step 102, after receiving the PAG-ADV signaling, the terminal starts a random access process according to the received resource information used for random access.

In step 102, the resource information used for random access could be the system information received via the superframe header, or the received system configuration information.

Then, the process shown in FIG. 1 is finished.

It can be seen from the process in FIG. 1 that a terminal is taken as an individual to interact with BS in order to implement random access.

In M2M technology, a M2M terminal can be accessed according to an access process similar to that shown in FIG. 1. However, in the access process shown in FIG. 1, the BS interacts with terminals the same as with individuals, and there are a number of M2M services with a very large amount of M2M terminals involved. For example, a cell can have a capacity of tens of thousands or hundreds of thousands of M2M terminals, if all these M2M terminals are accessed at the same time according to the access process shown in FIG. 1, a network access congestion may happen, and BS is incapable of accessing a large amount of M2M terminal at the same time.

SUMMARY OF THE INVENTION

To address the above-discussed deficiencies of the prior art, it is a primary object to provide a method for random access of M2M terminals in order for a number of M2M terminals can be accessed to the base station without network congestion.

Embodiments, of the present disclosure include a method for random access of Machine to Machine (M2M) terminals applied in a situation involving a plurality of M2M terminals. The method includes (A) dividing the a plurality of M2M terminals into at least one terminal group, and allocating an identifier for each terminal group; and (B) after receiving the paging broadcast signaling transmitted by the base station. The method further includes, an M2M terminal in a terminal group determining whether the terminal group identifier carried in the paging broadcast signaling is the identifier of the terminal group in which the M2M terminal is; and if yes, starting a random access process.

A method for random access of Machine to Machine (M2M) terminals applied in a situation involving a plurality of M2M terminals includes: (A) allocating priority for a service provided by each M2M terminal; and (B) after receiving the paging broadcast signaling transmitted by the base station, determining whether to start a random access process according to priority of the service that is provided by the terminal itself and is corresponding to service type indicator in the paging broadcast signaling.

A method for random access of Machine to Machine (M2M) terminals, applied in a situation involving a plurality of M2M terminals includes: (A) dividing the plurality of M2M terminals into at least one terminal group, and allocating an identifier for each terminal group; and (B) a M2M terminal in a terminal group obtaining the set minimum service priority from the system configuration signaling, and starting a random access process according to this minimum service priority and priority of the service to be reported.

A method for random access of Machine to Machine (M2M) terminals, the method comprising: (A) establishing M access channel groups; and (B) each M2M terminal receiving system broadcast message, and being accessed according to the indicator in the system broadcast message indicating whether each access channel group allows a M2M terminal to access.

It can be seen from the above technical scheme that, in embodiments of the present disclosure, a plurality of M2M terminals are divided into at least one terminal group, the base station transmits a paging broadcast signaling based on the terminal group, rather than issuing a paging broadcast signaling only to a M2M terminal that is taken as an individual, such that a large amount of M2M terminals can be randomly accessed smoothly and efficiently without causing network access congestion nor affecting the use of public network users.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2B illustrates PAG-ADV according to embodiments of the present disclosure;

FIG. 3B illustrates PAG-ADV provided by implementing the first alternative according to embodiments of the present disclosure;

FIG. 4B illustrates PAG-ADV according to implementing the second alternative according to embodiments of the present disclosure;

FIG. 5B illustrates a PAG-ADV according to implementing the third alternative according to embodiments of the present disclosure;

FIG. 6B illustrates priorities according to embodiments of the present disclosure;

FIG. 6E illustrates a minimum priority according to embodiments of the present disclosure;

FIG. 6F illustrates a priority temporary change field according to embodiments of the present disclosure;

FIG. 8A to FIG. 8C illustrate diagrams according to embodiments of the present disclosure.

DETAILED DESCRIPTION OF THE INVENTION

FIGS. 2A through 8C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. To make the object, technical scheme and advantages of the present disclosure clearer, the present disclosure will be illustrated in detail with reference to the drawings and specific embodiments hereinafter.

In an embodiment of the present disclosure, in order to implement the access to BS with a large number of M2M terminals, and to avoid network congestion from happening, a method is disclosed to group the mass M2M terminal and add base stations for calling based on the terminal groups.

Embodiment 1

Figure 1:
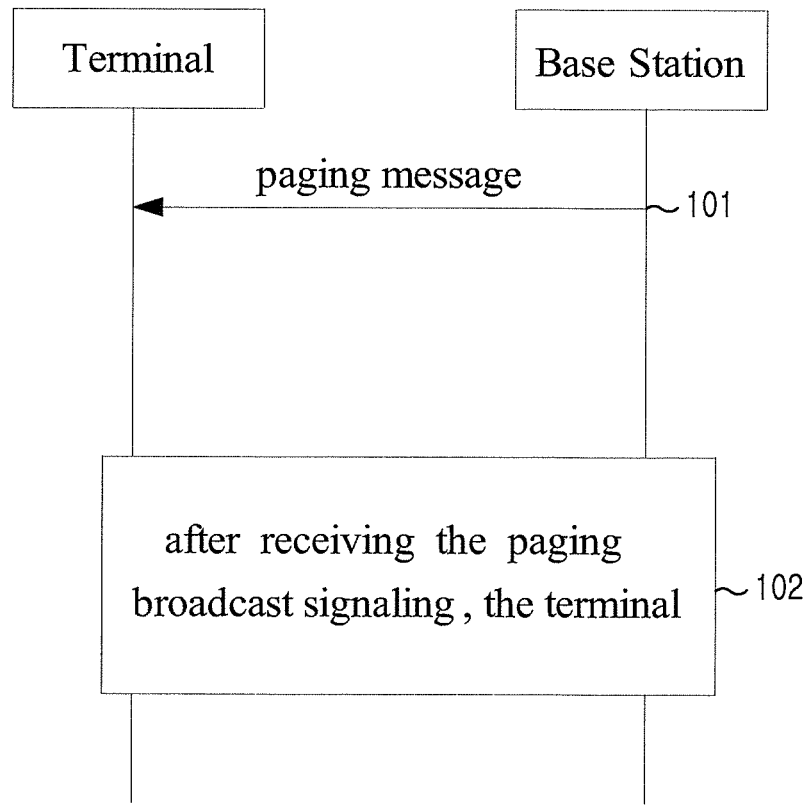
FIG. 1 illustrates a terminal access process.
Figure 2A:
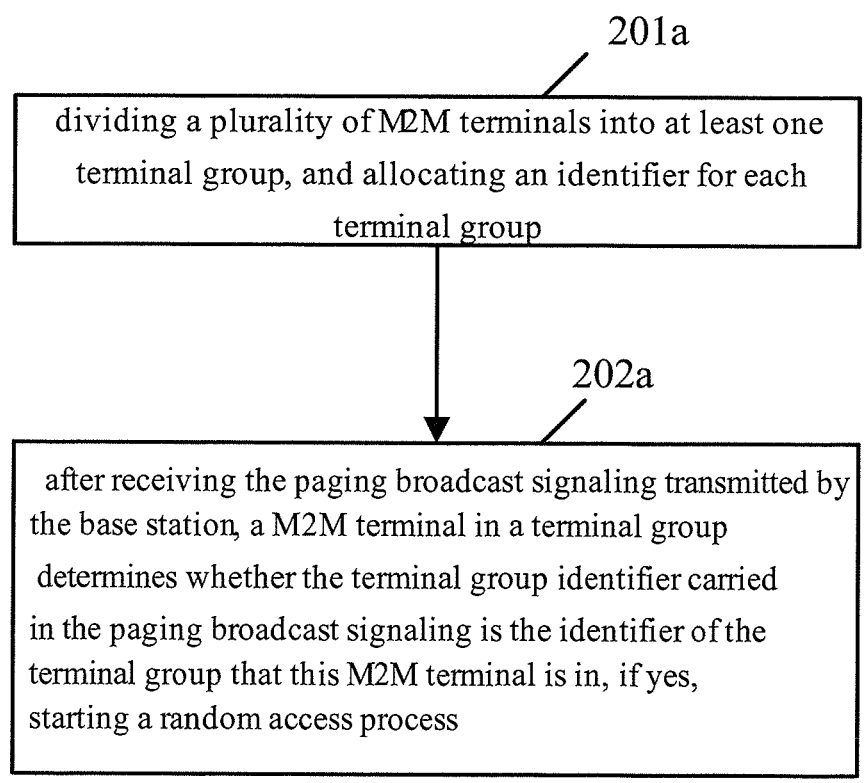
FIG. 2A is a basic flowchart according to embodiments of the present disclosure.

The method provided by a first embodiment of the present disclosure comprises the process shown in FIG. 2A.

FIG. 2A illustrates a basic flowchart provided by the first embodiment of the present disclosure. The method provided by embodiments of the present disclosure can be applied in a scenario concerning a plurality of M2M terminals. As shown in FIG. 2A, this process can include the following steps:

In step 201a, group the plurality of M2M terminals to form at least one terminal group and allocate a group identifier for each terminal group.

In practical communication applications, there are a tremendous number of M2M terminals. Therefore, the M2M terminals can be grouped according to a certain characteristic parameter such as service type, paging cycle and so forth in step 201a. Therein, the service type can be: an intelligent meter reading service; a monitoring service; a logistics tracking; a medical monitoring service; a security monitoring service; an ammeter alarm service; a security alarm service; and so forth.

After grouping the terminals, in order to distinguish the terminal groups, it is needed to allocate a Group ID for each terminal group.

In step 202a, after receiving the paging broadcast signaling transmitted by base station, an M2M terminal in a terminal group determines whether the terminal group identifier carried in the paging broadcast signaling corresponds to the terminal group to which this M2M terminal belongs; if yes, this M2M terminal starts a random access process.

The paging broadcast signaling in the present embodiment can be a PAG-ADV. The following description is described using the example of paging broadcast signaling being PAG-ADV, and other cases have similar principle. To implement the method provided by the present disclosure, the PAG-ADV is modified by adding a field for carrying the terminal group identifier.

In addition, the random access process performed in step 202a includes: when corresponding access resources are configured for a certain terminal group, the M2M terminals in this terminal group obtain corresponding access resources configured for this terminal group, and are accessed according to the obtained access resources randomly; and when corresponding access resources are configured for M2M terminals in a terminal group, each M2M terminal in this terminal group obtains corresponding access resources configured for this M2M terminal itself, and is accessed according to the obtained access resources randomly. The access resource can be random access opportunity, random access code, random contention window and so forth, which is not limited here.

Preferably, in step 202a, the PAG-ADV further can include a paging cycle. Therefore, when M2M terminals in a terminal group do not have the same paging cycle, before M2M terminals perform the above mentioned random access process, the method further can include: determining whether the paging cycle carried in the PAG-ADV is that of its own; if yes, continuing to start the random access process; otherwise, not starting the random access process.

Thereafter, the process shown in FIG. 2A finishes.

As a slight clarification, besides including a terminal group identifier and a paging cycle, the PAG-ADV in the present embodiment can further include a paging purpose such as a position update, a paging cycle update, a data report and so forth, as shown in FIG. 2B. Therein, the paging purpose is used for notifying M2M to perform corresponding operation according to this paging purpose.

The process provided in FIG. 2A will be described in detail with reference to the following several alternative hereinafter:

Alternative 1:

Comparing with the process shown in FIG. 2A, an object of the present alternative is to flexibly call M2M terminals in a terminal group, or to selectively and randomly access M2M terminals in the terminal group. To reach this object, M2M terminals in a terminal group are distinguished. For a specific application, each M2M terminal in the terminal group can be allocated with a Member ID and every Member ID is unique in the terminal group. Accordingly, every M2M in the terminal group will have two identifiers, one of which is Group ID and the other is Member ID.

Figure 3A:
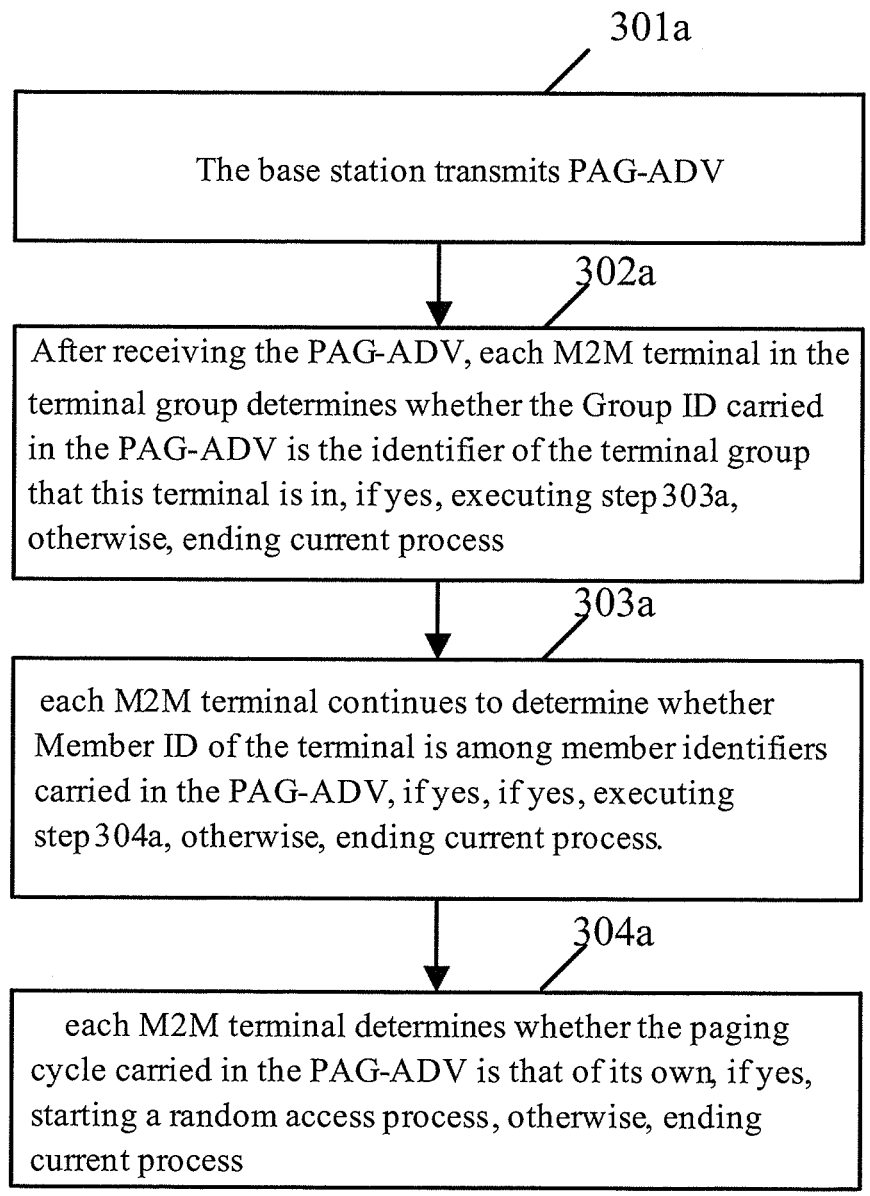
FIG. 3A illustrates a flowchart according to implementing a first alternative according to embodiments of the present disclosure.

The process provided by this alternative is as shown in FIG. 3A:

FIG. 3A illustrates a flowchart according to a first alternative of embodiments of the present disclosure. As shown in FIG. 3A, this process can include the following steps:

In step 301a, the base station transmits PAG-ADV.

The PAG-ADV transmitted in step 301a is different from that shown in FIG. 2B in that this PAG-ADV is added with a member identifier comparing with that shown in FIG. 2B. In FIG. 2B, member identifiers can be identified using member number and member MAC addresses, as shown in FIG. 3B.

In step 302a, after receiving the PAG-ADV, each M2M terminal in the terminal group determines whether the Group ID carried in the PAG-ADV is that of the terminal group to which this M2M terminal belongs; if yes, executing step 303a; otherwise, ending the current process.

In step 303a, each M2M terminal determines whether the Member ID of its own member identifiers is carried in the PAG-ADV; if yes, executing step 304a; otherwise, ending current process.

In step 304a, each M2M terminal determines whether the paging cycle carried in the PAG-ADV is that of its own; if yes, starting a random access process; otherwise, ending current process.

As a slight clarification, the above step 302a to step 304a are not necessarily executed in a fixed timing sequence, and the sequence can be replaced as follows: executing step 302a first; executing step 304a when the determining result is yes in step 302a; executing step 303a when the determining result is yes in step 304a; and starting a random access process when the determining result is yes in step 303a.

Then, the process shown in FIG. 3A finishes.

Through the process shown in FIG. 3A, the base station can call part of the members in a terminal group and further randomly access this part of members.

Figure 4A:
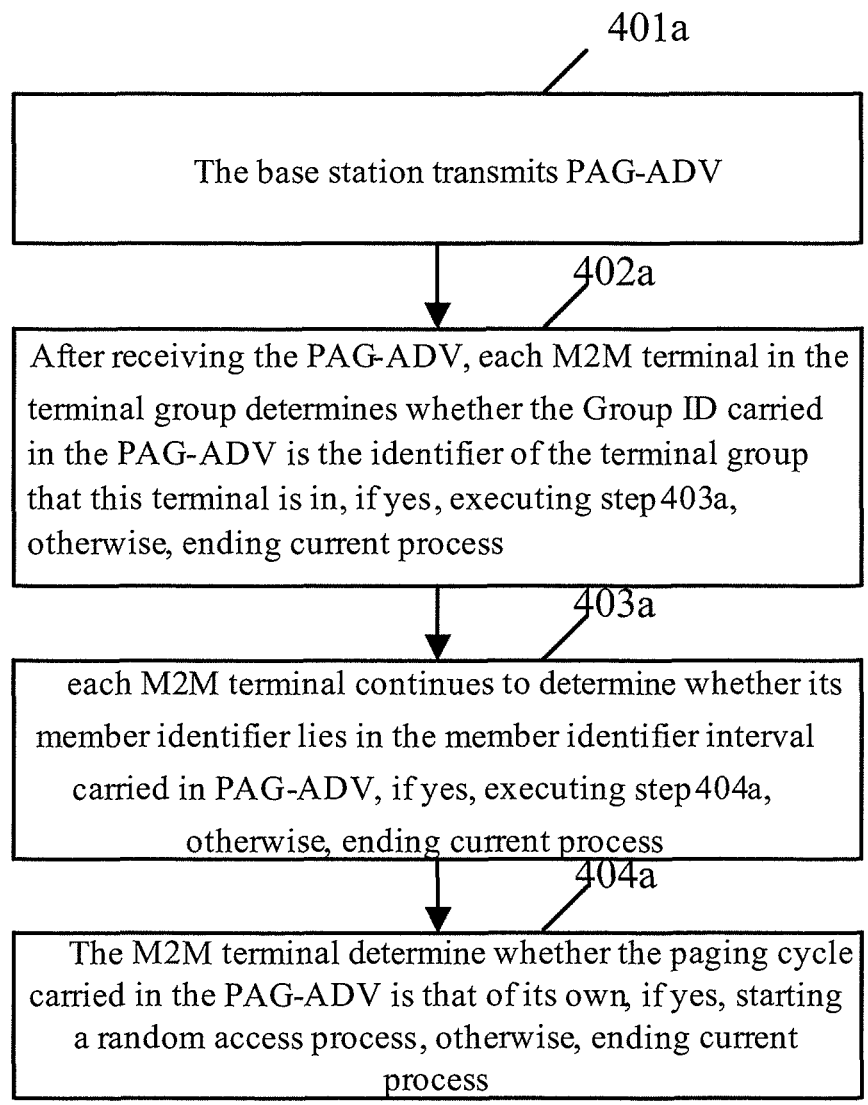
FIG. 4A illustrates a flowchart according to implementing a second alternative according to embodiments of the present disclosure.

Alternative 2:

As compared to the first alternative, a second alternative is to call members with a continuous length of member identifier values in a terminal group so as to randomly access these members with a continuous length of member identifier values. Similar to the first alternative, a Member ID is allocated for each member in the terminal group in the second alternative. The process according to the second alternative is as shown in FIG. 4A:

FIG. 4A illustrates a flowchart according to a second alternative of embodiments of the present disclosure. As shown in FIG. 4A, this process can include the following steps:

In step 401a, the base station transmits PAG-ADV.

The PAG-ADV transmitted in step 401a is different from that described above in that this PAG-ADV is added with a member identifier interval as compared with that shown in FIG. 2B. Therein, values of member identifiers in the member identifier interval are continuous, and the member identifier interval is formed of the first member identifier, member identifiers from the first member identifier to the second member identifier and the second member identifier. The first member identifier has the smallest value among the member identifier interval while the second member identifier has the greatest value among the member identifier interval as shown in FIG. 4B.

Step 402a is similar to step 302a.

In step 403a, each M2M terminal continues to determine whether its member identifier is within the member identifier interval carried in PAG-ADV. If yes, the M2M terminal execute step 404a; otherwise, the M2M terminal ends the current process.

Step 404a is similar to step 304a.

Then, the process shown in FIG. 4A finishes.

As a slight clarification, usually the base station cannot wake up all members in the terminal group by sending PAG ADV only once. In order to guarantee to wake up more members for a random access process, the base station has to send PAG-ADV many times. However, sending the PAG-ADV multiple times will bring about a problem. While sending PAG-ADV many times, the members that have already been awakened may receive the PAG-ADV again and be accessed randomly again, which can cause network congestion and a waste of resources, and increase power consumption of the members. To solve this problem, a third alternative is provided by the present disclosure.

Figure 5A:
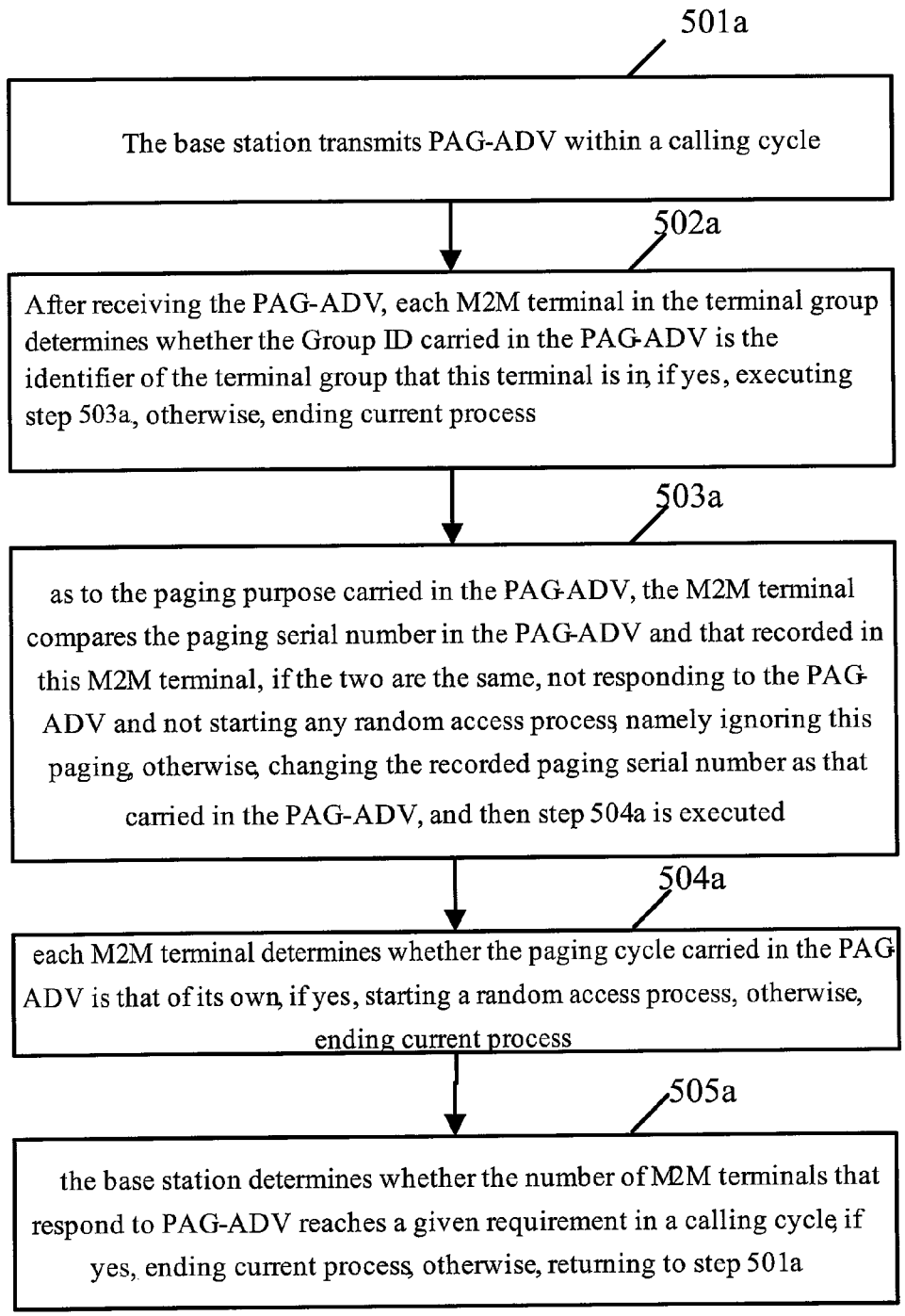
FIG. 5A illustrates a flowchart according to implementing a third alternative according to embodiments of the present disclosure.

Alternative 3:

The third alternative is designed so that, when the base station calls the same terminal group by sending PAG-ADV more than once in one calling cycle and the PAG-ADV carries the same calling purpose, the already awake members do not respond to the repeated calls by the base station, and thus are not randomly accessed repeatedly. Therein, a calling cycle includes a plurality of paging cycles. FIG. 5A shows the process of the third alternative.

FIG. 5A illustrates a flowchart provided by a third alternative according to embodiments of the present disclosure. As shown in FIG. 5A, this process can include the following steps:

In step 501a, the base station transmits PAG-ADV within a calling cycle.

As compared to the PAG-ADV shown in FIG. 2B, the PAG-ADV in step 501a is added with a field for cam/Mg paging serial numbers for paging purpose. The size of this filed can be multiple bits, that is, at least two bits. Therein, as to a paging for a certain paging purpose, paging serial numbers of all PAG-ADV sent by the base station in the same calling cycle are not changed. However, while in different calling cycles, no matter whether the paging purpose carried in a PAG-ADV is changed or not, paging serial number in this PAG-ADV will be changed anyway. That is, if paging purpose in current calling cycle is the same as that in the previous calling cycle, a paging serial number in current calling cycle is the paging serial number in the previous calling cycle plus 1. If paging purpose in current calling cycle is different from any paging purpose in the previous calling cycles, the paging serial number in current calling cycle is a value different from any number in the previous calling cycles. For example, in the light of a paging purpose, the paging serial numbers of all PAG-ADV that the base station sends in the first calling cycle are the first value, such as 0. When it comes to the second calling cycle, the paging serial numbers of all PAG-ADV that the base station sends in the second calling cycle are the second value, such as 1.

As a slight clarification, in the current embodiment, when a M2M terminal has not responded to a PAG-ADV carrying a paging purpose in a calling cycle, paging serial number in the light of this paging purpose is recorded as a numerical value other than the paging serial number in the light of this paging purpose carried in this PAG-ADV.

Step 502a is similar to step 302a.

In step 503a, with regard to the paging purpose carried in the PAG-ADV, the M2M terminal compares the paging serial number in the PAG-ADV and that recorded in this M2M terminal; if the two are the same, not responding to the PAG-ADV and not starting any random access process, namely ignoring this paging; otherwise, changing the recorded paging serial number as that carried in the PAG-ADV. Thereafter, step 504a is executed.

Step 504a is similar to step 304a.

In step 505a, the base station determines whether the number of M2M terminals that have responded to PAG-ADV reaches a given requirement in a calling cycle; if yes, ending current process; otherwise, returning to step 501a.

Step 505a and step 504a are not necessarily executed in a fixed timing sequence, and can be executed at the same time.

Generally, after being successfully accessed, the M2M terminal responds to the received PAG-ADV.

The given requirement in this step 505a can be that the number of M2M terminals responding to PAG-ADV that reach a given threshold; or there are as many M2M terminals responding to PAG-ADV for continuously N times (N is greater than or equal to 2); or the difference thereof is less than a given threshold, and this given threshold can be set according to practical application, which is not limited here.

Preferably, in step 505a, when the number of M2M terminals responding to PAG-ADV reaches a given threshold value, to make sure that there are as many M2M terminals responding to PAG-ADV for random access as possible in the terminal group, the following step can be executed: the base station calls the rest M2M terminals not responding to PAG-ADV separately or one by one.

Then, the process shown in FIG. 5A is finished.

With the process shown in FIG. 5A, it is guaranteed that, when the base station sends PAG-ADV to the same terminal group multiple times in the same calling cycle and the PAG-ADV carries the same purpose, the already awake members do not respond to the calls from the base station, and thus are not accessed repeatedly.

As a slight clarification, in embodiments of the present disclosure, as to a terminal group, for convenience of management, at least one of all M2M terminals in this terminal group is assigned to be the group representative, and other M2M terminals are group members correspondingly (recorded as situation 1), or all M2M terminals in this terminal group are assigned to be group members (recorded as situation 2). As to situation 2, the members can be accessed according to any of the processes of the above described embodiment 1 to embodiment 3.

However, as to situation 1, it is defaulted under usual situation that the group representative take the lead in responding to PAG-ADV transmitted by base station, namely the group representative is the first to start a random access representing the terminal group, in order to guarantee that the members can also be randomly accessed, the third alternative of the present disclosure also provides the following ways:

Way 1:

Another paging field is added to the PAG-ADV shown in FIG. 5B, and a size of this paging field can be a plurality of bits, or at least 1 bit. Size of this paging field is used to indicate whether this is a paging for the first time. For example, when value of the paging field is 2 (which can be the same as the above mentioned second value like 0), this paging is identified as for the first time, when value of the paging field is 1 (which can be the same as the above mentioned first value like 1), this paging is identified as not being for the first time.

Therein, when value of the paging field is 2, a group representative of the terminal group will be accessed for the first time on behalf of this terminal group, and the group members are accessed randomly after receiving from the base station the acknowledgement for this group representative's access.

As such, a response to PAG-ADV in step 503a can include: determining whether value of the paging field is 1 or 2, if the value thereof is 2, when the terminal itself is the group representative, continuing to execute the operation of responding to PAG-ADV; when the terminal is a member, waiting for the base station to successfully respond to the access started by group representative of this terminal group on behalf of this terminal group before executing the operation of responding to PAG-ADV; if the value thereof is 1, continuing to executing the operation of responding to PAG-ADV.

Preferably, because there is a small number of group representatives in a terminal group after all, to save network resources, as a extension of embodiments of the present disclosure, the group representatives may not execute the above step 503a. As such, before step 503a, the method includes: determining its identity as a group representative or group member; if it is a group representative, determining whether value of the paging field is 1 or 2; if the value is 2, continuing to executing the operation of responding to PAG-ADV; if the value is 1, not executing the operation of responding to PAG-ADV; if the M2M terminal is a group member, executing step 503a.

As a slight clarification, the above paging field is set based on a scheduling of the base station. To save network resources, after the base station sends a PAG-ADV, values of paging fields of subsequently sent PAG-ADV can be set as 2 so as to make M2M terminals receiving this PAG-ADV regard this PAG-ADV as being transmitted for the first time. The group representative will still start the access for the first time in the form of terminal group after receiving this PAG-ADV but will not report any data.

Way 2:

As compared with way 1, it is not necessary to add the above mentioned paging field in PAG-ADV in way 2, but rather adopt the PAG-ADV shown in FIG. 5B. Therefore, after group representative and members in the terminal group all receive the PAG-ADV, the group representative will take the lead in responding to the PAG-ADV and starting the random access. The group members will automatically wait for the group representative to start the random access, respond to the PAG-ADV and start the random access after detecting that the broadcast signaling (RNG-ACK) includes the acknowledgement of random access code sent by this group representative belonging to the terminal group that this group representative is in.

By now, description upon way 1 and way 2 is finished.

As a slight clarification, a group representative is not fixed in one terminal group, but can move, for example, from station 1 to station 2. Under such situation, in the present embodiment, when a group representative detects that it has reached a new base station, it will change its identity as a member. Here, it may happen that the terminal group that this group representative is in may not have group representative any more, which will affect the random access of other members in the terminal group. As such, a timer (used to indicate whether the random access transmitted by the group representative is timed out) is set for each group member in the terminal group in embodiments of the present disclosure. When members in the terminal group receive PAG-ADV, if the timer is timed out, the members will still wait for the base station to successfully respond to the access started by the group representative on behalf of the terminal group that the members is in, or, the members can start random access voluntarily if the members do not detect the random access acknowledgement information RNG-ACK sent to this group representative or do not detect any RNG-ACK of random access code sent by this group representative belonging to the terminal group that includes this group representative.

Way 3:

After adopting the characteristic of embodiment 1 or embodiment 2 to set several group representatives in a terminal group to respond to PAG-ADV, identifiers of the members to be paged are carried in PAG-ADV. Therefore, responding to PAG-ADV in step 503a comprises: determining whether identity of its own is a group representative or a group member; continuing to determine whether the member identifier of its own is among the group member identifiers carried in the PAG-ADV; if yes, continuing to execute the operation of responding to PAG-ADV; otherwise, waiting for the base station to successfully respond to the access started by the group representative on behalf of this group before starting an uplink random access.

By now, descriptions of the above three ways are finished. As a slight clarification, as to situation 1, the above mentioned three ways are just exemplary and are not used to limit embodiments of the present disclosure.

By now, implementing ways of the embodiments are finished.

As a slight clarification, M2M is service oriented (to medical monitoring, intelligent meter reading and so on). While generally, there are different grades of different services. Considering applicability of embodiments of the present disclosure, methods provided by embodiments of the present invention have to support different grades of services, so as to protect customer experience of original network users. This can be described via embodiment 2:

Embodiment 2

Figure 6A:
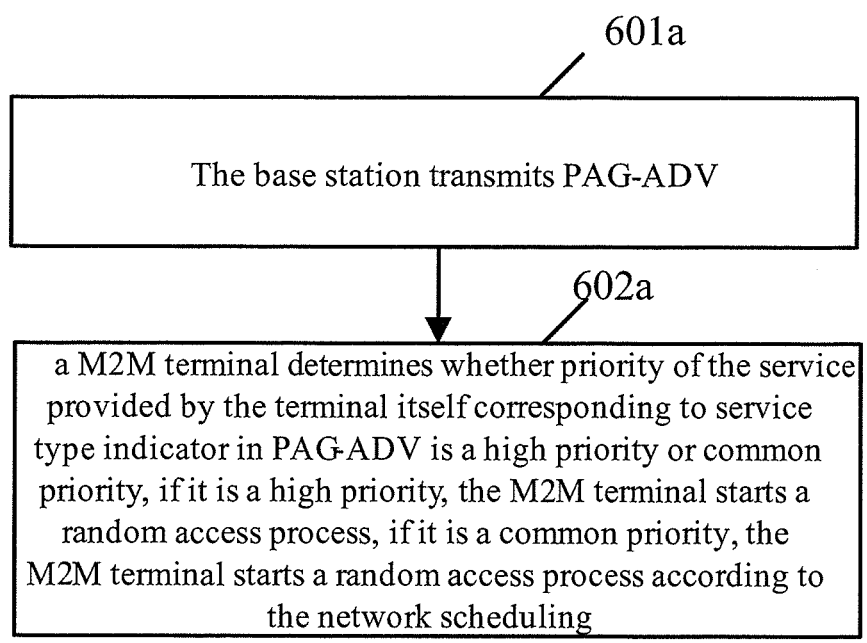
FIG. 6A illustrates a first flowchart according to embodiments of the present disclosure.

In embodiment 2, services provided by M2M terminals in a terminal group are allocated with service priorities. Therein, the allocation can be performed by manual configuration or by network or BS broadcasting or by M2M terminal negotiating with BS or network. Afterwards, after receiving the PAG-ADV transmitted by the base station, the M2M terminal determines whether to start a random access process according to the service priority that is provided by itself and is corresponding to service priority indicator in the PAG-ADV. Embodiment 2 will be described via three processes:

FIG. 6A is the first flowchart provided by embodiment 2 of the present disclosure. In this process, services are usually provided with two kinds of priorities, one is high priority identified as 1, while the other is common priority identified as 0, specifically with reference to the priority diagram shown in FIG. 6B. Therein, the priority takes 1 bit or other values of course, which is not limited by embodiments of the present disclosure and can be defined flexibly according to practical need by all means. Therein, in practical application, services of high priority can be: medical monitoring, security monitoring, ammeter alarm, security alarm, telecommunications services and so forth. Services with common priority can be: intelligent meter reading, monitoring, logistics tracking and so on. Certainly, a plurality of priorities rather than only two priorities can be set according to different services.

Therefore, as shown in FIG. 6A, this process can comprise:

In step 601, the base station transmits PAG-ADV.

PAG-ADV is shown by FIG. 2B in step 601a.

In step 602a, the M2M terminal determines whether priority of the service provided by the terminal itself corresponding to service type indicator in PAG-ADV is a high priority or common priority. If it is a high priority, the M2M terminal starts a random access process. If it is a common priority, the M2M terminal starts a random access process according to the network scheduling.

In step 602a, service type indicator can be comprised in paging purpose of PAG-ADV or be independent of paging purpose, such as, setting a filed specially to carry service type indicator.

Preferably, in embodiment 2 of the present disclosure, between step 601a and step 602a, the method can further comprise a step as described in step 302a. And before starting the random access in step 602a, the method further can comprise a step as described in step 304a.

By now, the process in FIG. 6A is finished.

Figure 6C:
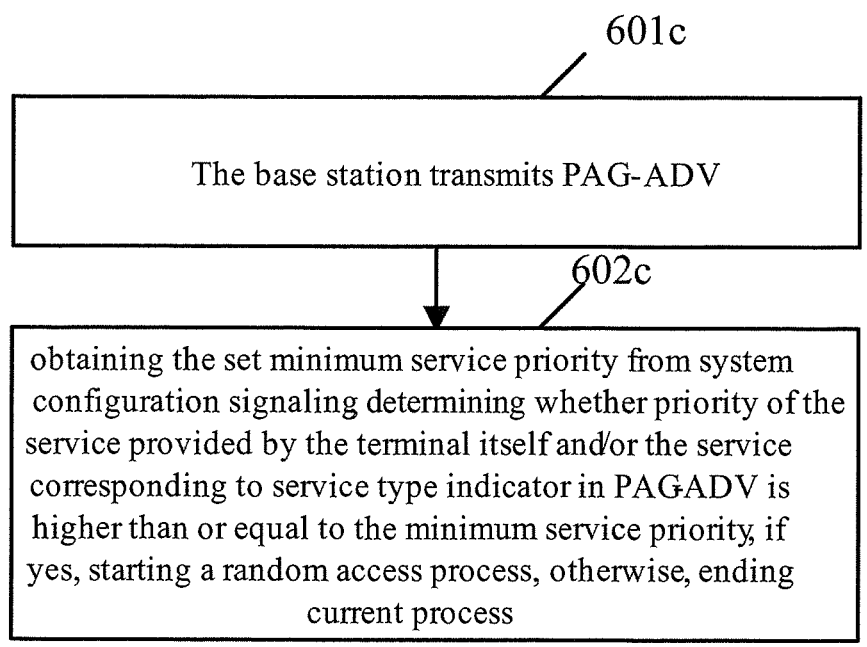
FIG. 6C illustrates a second flowchart according to embodiments of the present disclosure.

Preferably, the present embodiment 2 also provides a second flowchart as shown in FIG. 6C.

FIG. 6C illustrates the second flowchart provided by embodiment 4 of the present disclosure. As shown in FIG. 6C, this process can comprise the following steps:

Step 601c is similar to step 601a.

In step 602c, obtaining the set minimum service priority from system configuration signaling; determining whether priority of the service that is provided and/or received by the terminal and is corresponding to service type indicator in PAG-ADV is higher than or equal to the minimum service priority; if yes, starting a random access process; otherwise, ending current process.

The system configuration signaling in this step 602c can be an System Configuration Description (SCD), or be a superframe, which is not limited by embodiments of the present disclosure.

The minimum service priority in step 602c is set by the system according to practical situation. Because a system configuration signaling such as a SCD is usually a periodic signaling, based as such, this minimum service priority can be identified by only one parameter.

Preferably, in embodiment 2 of the present disclosure, between step 601c to step 602c, the method further can include a step as described in step 302a. Additionally, before starting the random access in step 602c, the method further can include a step as described in step 304a.

By now, the process shown in FIG. 6C is finished. In the process shown in FIG. 6C, any M2M terminal that provides services with priorities lower than this minimum service priority cannot be randomly accessed. However, the process shown in FIG. 6C is not flexible to implement because the M2M terminal access is limited by a minimum priority. Therefore, the present embodiment 4 also provides another improved process, specifically as shown in FIG. 6D.

Figure 6D:
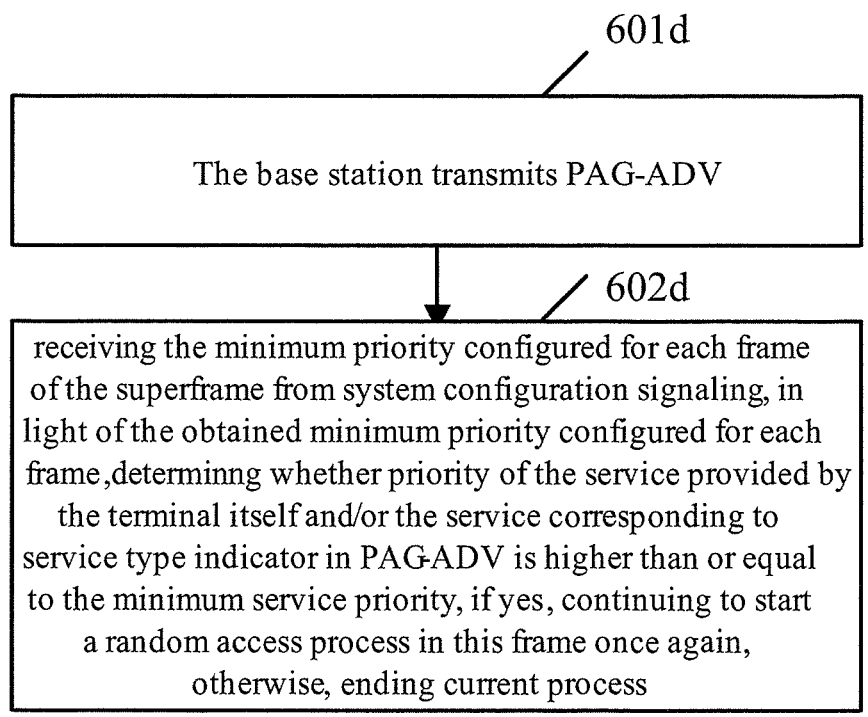
FIG. 6D illustrates a third flowchart according to embodiments of the present disclosure.

FIG. 6D is the third flowchart provided by embodiment 4 of the present disclosure. This process is mainly based on a superframe in the system having four frames. As such, each frame is set with a minimum priority in this process, so that there are four priorities. These four priorities are all carried in a system configuration signaling, as shown in FIG. 6E. Therein, each priority takes one bit, or other values of course.

The number of bits taken is mainly determined according to number of the plotted priorities, while it is not limited by embodiments of the present disclosure and can be determined according to practical need flexibly by all means.

Based as such, as shown in FIG. 6D, this process comprises the following steps:

Step 601d is similar to step 601d.

In step 602d, obtaining the minimum priority configured for each frame of the superframe from system configuration signaling; in light of the obtained minimum priority configured for each frame; determining whether priority of the service provided by the terminal itself and/or the service corresponding to service type indicator in PAG-ADV is higher than or equal to the minimum service priority; if yes, continuing to start a random access process at this frame; otherwise, ending current process.

In certain advantageous embodiments, in step 603d, before starting a random access process in this frame once again, the method further comprises in this step: determining whether the paging cycle carried in the received PAG-ADV is that of its own; if yes, continuing to start a random access process in this frame; otherwise, ending current process.

Preferably, in embodiment 2 of the present disclosure, between step 601d and step 602d, the method further can include a step as described in step 302a.

By now, the process shown in FIG. 6D is finished. By the process shown in FIG. 6D, access of the M2M terminal becomes more flexible.

Preferably, in embodiments of the present disclosure, in order to make it realized that M2M terminals with low priorities can be randomly accessed, the present disclosure creatively proposes a scheme that changes service priorities temporarily. To reach this object, in process of FIG. 6D or FIG. 6C, a priority temp modified field is further added to PAG-ADV transmitted by the base station, which is used to carry a mapping relation between services whose priorities need to be modified temporarily and the modified priorities of these services. This added priority temp modified field is as shown in FIG. 6F. Therefore, determining whether priority of a service is higher than or equal to the minimum priority in the process of FIG. 6D or FIG. 6C is: obtaining the mapping relation between the service needing modifying the priority temporarily in the PAG-ADV and the temporary priority of this service; changing priority of the service needing modifying the priority temporarily to a temporary priority; determining whether this temporary service priority is higher than or equal to the minimum service priority. Generally, all temporary priorities of services can all ensure random access of M2M terminals. Therefore, M2M terminals providing services with low priorities can also be randomly accessed.

Further, in embodiments of the present disclosure, after the M2M terminal provides a service with a temporarily changed priority is randomly accessed, priority of this service is further changed back to the priority before being changed.

As a slight clarification, a priority allocated to a service as above is not constant, while can be updated with time passing or service change. Accordingly, the present disclosure also provides the following two ways for updating a service priority:

The first way:

In the first way, the network side or base station transmits a request for updating service priority, wherein this request carries the mapping relation between the service and the latest priority. After receiving this request, the M2M terminal updates priority of the service carried in this request with the latest priority corresponding to the service, and meanwhile, gives an acknowledgement to confirm that priority of this service has been changed according to the mapping relation between the service and the lasted priority.

The second way:

In the second way, the network side or base station transmits system broadcast information, wherein this system broadcast information carries the mapping relation between the service and the latest priority. After receiving this system broadcast information, the M2M terminal updates priority of the service carried in this system broadcast information with the latest priority corresponding to the service.

The above two ways are just examples of updating service priority, but not used to limit embodiments of the present invention.

The process provided by embodiment 2 of the present invention is described as above.

As a slight clarification, in each of the above mentioned embodiments, a M2M terminal starts a random access process with the trigger of the base station issuing PAG-ADV. As an extension of embodiments of the present disclosure, a terminal can also be accessed automatically, with reference to embodiment 3 specifically:

Embodiment 3

Figure 7A:
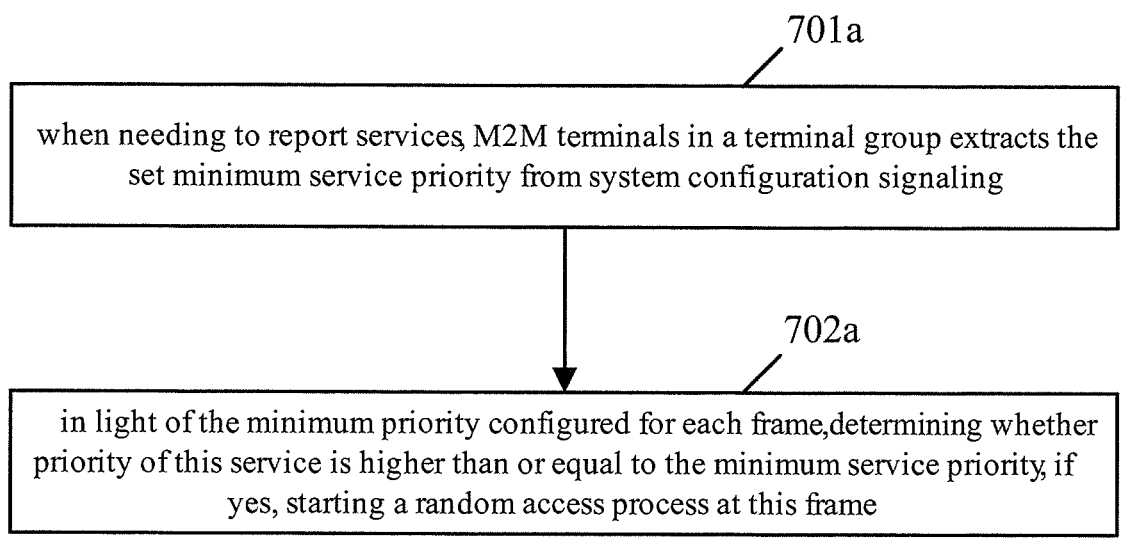
FIG. 7A illustrates another flowchart according to embodiments present disclosure.

FIG. 7A is a flowchart of embodiment 3 provided by the present disclosure. As shown in FIG. 7A, this process can include the following steps:

In step 701a: when needing to report services, the M2M terminals in a terminal group obtain the set minimum service priority from system configuration signaling.

In step 702a: determining whether priority of this service is higher than or equal to the minimum service priority, if yes, starting a random access process.

By now, the process shown in FIG. 7A is finished.

Figure 7B:
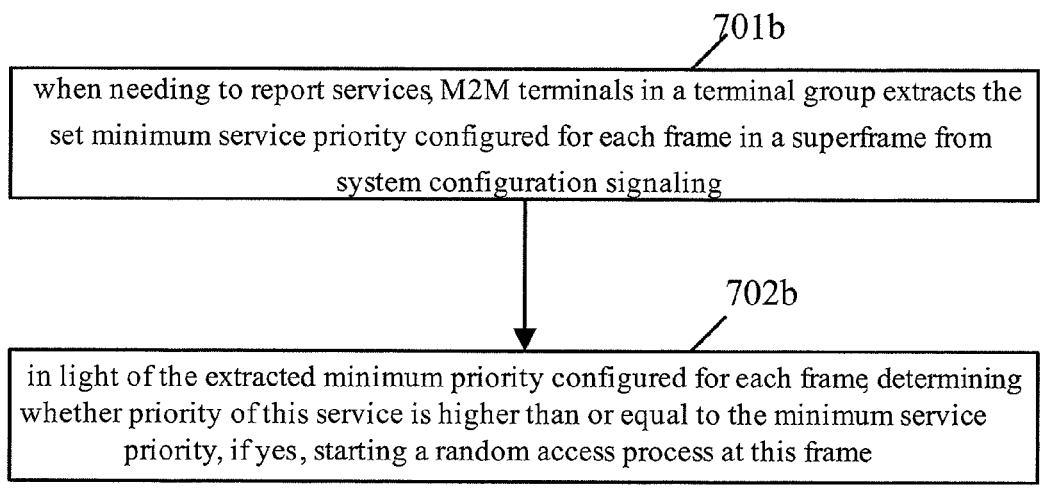
FIG. 7B illustrates another flowchart according to embodiments of the present disclosure.

FIG. 7B is another flowchart of embodiment 3 provided by the present disclosure. As shown in FIG. 7B, this process can include the following steps:

In step 701b: when needing to report services, the M2M terminals in a terminal group obtain the set minimum service priority configured for each frame in a superframe from system configuration signaling.

In step 702b: in light of the obtained minimum priority configured for each frame, determining whether priority of this service is higher than or equal to the minimum service priority; if yes, starting a random access process at this frame.

By now, the process shown in FIG. 7B is finished.

As a slight clarification, in step 702a or step 702b, an M2M terminal can start a random access on behalf of a terminal group, such as, starting a random access by using the random access code of the terminal group, or starting a random access as an individual only, such as, starting a random access by only using the random access code of its own; or, determining whether identity of its own is a group representative or a group member, if group representative, starting a random access on behalf of the terminal group, if group member, or starting a random access as an individual only. Specific situation is not limited hereby.

By now, description of embodiment 2 is finished.

Embodiment 3

There are four kinds of uplink access channel configurations at present as follows: the first kind is that every frame of each superframe (each superframe includes four frames) comprises an uplink random access channel; the second kind is that the first frame of each superframe comprises an uplink random access channel; the third kind is that every two superframes (mod(superframe number,2)==0) comprise one uplink random access channel, namely there is one uplink random access channel in every other superframe; the fourth kind is that every four superframes (mod(superframe number, 2)==0) comprise one uplink random access channel, namely there is one uplink random access channel every four superframes.

Based on the present four kinds of configurations of uplink access channel, embodiment 3 of the present disclosure considers dividing uplink random access resources of the system into M access channel groups, and these M access channel groups take N superframes, wherein, N=M*W.

Here, M is the number of access channel groups, while W is the number of superframes comprised in each access channel group.

As a slight clarification, in embodiment 3 of the present disclosure, different access channel groups can include the same number of superframes. Here, the above mentioned W can be denoted as: W=S*h, wherein, S is the basic resource group, which is common multiple of the smallest superframe in the four kinds of configurations, namely 4 superframes. h denotes number of basic resource groups comprised in each access channel group, which can be 1 or other values, taking the example of h being 1, which means that every access channel group comprises one basic resource group namely 4 superframes.

Certainly, as an extension of embodiments of the present disclosure, different access channel groups comprise different numbers of superframes. Here, the above mentioned W can be expressed by the following formula:

$W=S*h_1+S*h_2+ \ldots +S*h_M$, wherein, $h_M$ is the number of basic resource groups comprised in the $M_{th}$ access channel group. Taking the example of M being 4, if the first access channel resource group comprises 1 basic resource group, namely 4 superframes, the second access channel resource group comprises 2 basic resource group, namely 8 superframes, the third access channel resource group comprises 3 basic resource group, namely 12 superframes, the fourth access channel resource group comprises 4 basic resource group, namely 16 superframes.

Based on the above mentioned M access channel groups, the following formula can be used to determine which access channel group a superframe belongs to in embodiment 3 of the present disclosure:

$R=\mathrm{mod}(\text{superframe number}, N)$ therein, N is as described above, for specific implementation, value of N is exponential form of 2 (2^n, n is a nonnegative integer 0,1,2 ... ). R is a relative identifier of access channel group of a superframe, used to indicate which access channel group the superframe belongs to. Taking example of dividing uplink random access resources into 4 random access channels in the present embodiment 3, $0 \leq R \leq 3$ is taken as access channel group (i), $4 \leq R \leq 7$ is taken as access channel group (i+1), $8 \leq R \leq 11$ is taken as access channel group (i+2), $12 \leq R \leq 15$ is taken as access channel group (i+3), as shown in FIG. 8A.

Based on the above mentioned M access channel groups, L bits are added to a system broadcast message like a system configuration description message (AAI-SCD) transmitted by the network side or the base station in the present embodiment, so as to indicate whether each access channel is allowed of M2M terminal to access, wherein, an access channel group can determine whether to allow M2M terminal to access according to practical network situation, if the access channel group allows M2M terminal to access, the bit corresponding to this access channel group can be set as the first value like 0, otherwise, the bit corresponding to this access channel group can be set as the second value like 1. Taking the example of the first value being 0 and the second value being 1, FIG. 8B is a diagram illustrating whether the access channel group allows M2M terminal to access.

As a slight clarification, L can be equal to M, taking the example of M being 4, value of L can also be 4.

Based on the above description, uplink random access resources of the system can be flexibly scheduled by setting L bit value in the system broadcast message, taking the example of system broadcast message being system configuration description message and the first value being 0 and the second value being 1, FIG. 8C shows a diagram illustrating a system broadcast message.

By now, description of embodiment 3 of the present disclosure is finished.

As a slight clarification, requirement document of IEEE 802.16p request to support a large number of M2M terminals to access, and the method of the present disclosure described above can meet the standard requirement of IEEE802.16p completely.

It can be seen from the above technical scheme that, in the present disclosure, a plurality of M2M terminals are divided into at least one terminal group, the base station transmits a paging broadcast signaling based on the terminal group, rather than issuing a paging broadcast signaling only to a M2M terminal that is taken as an individual as in the prior art, so that a large amount of M2M terminals can be randomly accessed smoothly and efficiently in comparison with the prior art, without causing network access congestion nor affecting the use of public network users.

The above illustrations are just a advantageous embodiments of the present disclosure and are not used to limit the present disclosure. Any modification, equivalent substitute and improvement within spirit of the present disclosure are in protection scope of the present disclosure.

What is claimed is:

1. A method for operating a Machine to Machine (M2M) device, the method comprising:
   receiving, by the M2M device, a system broadcast message including restriction information from a base station; and
   determining, by the M2M device, an access class among a plurality of access classes; and
   accessing the base station based on the access class and the restriction information, wherein the restriction information indicates whether the accessing is restricted or not,
   wherein if the restriction information of the access class is set to '0', the M2M devices of the access class access to the base station, and
   if the restriction information of the access class is set to '1', the M2M devices of the access class do not access to the base station.

2. The method according to claim 1, wherein the restriction information indicates whether the M2M device can use ranging during network reentry or not.

3. The method according to claim 1, wherein the restriction information includes L bits, and the plurality of access classes includes M access classes.

4. The method according to claim 3, wherein L is equal to M.

5. The method according to claim 1, wherein each access class comprises a plurality of superframes, and each superframe comprises a plurality of frames, and
   wherein an access class which a superframe belongs to is expressed as the following:
   R =mod (superframe number, N)
   where R represents a relative identifier of access class of a superframe, N=M*W is a total number of superframes which all of access class include, M is a total number of access class, and W is the number of superframes in one access class.

6. A method for operating a base station for random access of Machine to Machine (M2M) devices, the method comprising:
- determining, by the base station, a system broadcast message including restriction information for a plurality of access classes;
- transmitting, by the base station, the system broadcast message including restriction information to the M2M devices,
- wherein the restriction information indicates whether an access of the M2M devices are restricted or not,
- wherein if the restriction information of the access class is set to '0', the M2M devices of the access class access to the base station, and
- if the restriction information of the access class is set to '1', the M2M devices of the access class do not access to the base station.

7. The method according to claim 6, wherein the restriction information indicates whether the M2M devices can use ranging during network reentry or not.

8. The method according to claim 6, wherein the restriction information includes L bits, and the plurality of access classes includes M access classes.

9. The method according to claim 8, wherein L is equal to M.

10. The method according to claim 6, wherein each access class comprises a plurality of superframes, and each super frame comprises a plurality of frames, and
- wherein an access class which a superframe belongs to is expressed as the following:
- R =mod (superframe number, N)
- where R represents a relative identifier of access class of a superframe, N=M*W is a total number of superframes which all of access class include, M is a total number of access class, and W is the number of superframes in one access class.

11. A base station for random access of Machine to Machine (M2M) devices, the apparatus comprising:
- a controller configured to determine a system broadcast message including restriction information for a plurality of access classes; and
- a transmitter configured to transmit the system broadcast message including restriction information to the M2M devices,
- wherein the restriction information indicates whether an access of the M2M devices are restricted or not,
- if the restriction information of the access class is set to '0', the M2M devices of the access class access to the base station, and
- if the restriction information of the access class is set to '1', the M2M devices of the access class do not access to the base station.

12. The apparatus according to claim 11, wherein the restriction information indicates whether the M2M devices can use ranging during network reentry or not.

13. The apparatus according to claim 11, wherein the restriction information includes L bits, and the plurality of access classes includes M access classes.

14. The apparatus according to claim 13, wherein L is equal to M.

15. The apparatus according to claim 11, wherein each access class comprises a plurality of superframes, and each super frame comprises a plurality of frames, and
- wherein an access class which a superframe belongs to is expressed as the following:
- R =mod (superframe number, N)
- where R represents a relative identifier of access class of a superframe, N=M*W is a total number of superframes which all of access class include, M is a total number of access class, and W is the number of superframes in one access class.

16. A Machine to Machine (M2M) device, comprising:
- a receiver configured to receive a system broadcast message including restriction information from a base station;
- a controller configured to determine an access class among a plurality of access classes; and
- a transmitter configured to access to the base station based on the access class and the restriction information,
- wherein the restriction information indicates whether the accessing is restricted or not,
- if the restriction information of the access class is set to '0', the M2M devices of the access class access to the base station, and
- if the restriction information of the access class is set to '1', the M2M devices of the access class do not access to the base station.

17. The apparatus according to claim 16, wherein the restriction information indicates whether the M2M devices can use ranging during network reentry or not.

18. The apparatus according to claim 16, wherein the restriction information includes L bits, and the plurality of access classes includes M access classes.

19. The apparatus according to claim 18, wherein L is equal to M.

20. The apparatus according to claim 16, wherein each access class comprises a plurality of superframes, and each super frame comprises a plurality of frames, and
- wherein an access class which a superframe belongs to is expressed as the following:
- R =mod (superframe number, N)
- where R represents a relative identifier of access class of a superframe, N=M*W is a total number of superframes which all of access class include, M is a total number of access class, and W is the number of superframes in one access class.

* * * * *